(12) United States Patent
Ichikawa

(10) Patent No.: US 9,698,977 B2
(45) Date of Patent: Jul. 4, 2017

(54) INFORMATION PROCESSING APPARATUS, INFORMATION PROCESSING METHOD, AND PROGRAM

(71) Applicant: Mitsubishi Electric Corporation, Chiyoda-ku (JP)

(72) Inventor: Sachihiro Ichikawa, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 177 days.

(21) Appl. No.: 14/433,720

(22) PCT Filed: Oct. 22, 2013

(86) PCT No.: PCT/JP2013/078550
§ 371 (c)(1),
(2) Date: Apr. 6, 2015

(87) PCT Pub. No.: WO2014/112170
PCT Pub. Date: Jul. 24, 2014

(65) Prior Publication Data
US 2015/0249536 A1  Sep. 3, 2015

(30) Foreign Application Priority Data

Jan. 16, 2013 (JP) ................................. 2013-005721

(51) Int. Cl.
*H04L 9/08* (2006.01)
*H04L 9/14* (2006.01)

(52) U.S. Cl.
CPC .......... *H04L 9/0841* (2013.01); *H04L 9/0847* (2013.01); *H04L 9/14* (2013.01); *H04L 2209/24* (2013.01)

(58) Field of Classification Search
CPC ..... H04L 9/06; H04L 9/00; H04L 9/30; H04L 9/18; G06F 7/725

(Continued)

(56) References Cited

U.S. PATENT DOCUMENTS 6,731,755 B1 * 5/2004 Cocks .................... H04L 9/302
380/277
9,276,746 B2  3/2016 Hattori et al.
(Continued)

FOREIGN PATENT DOCUMENTS

JP           6 259012          9/1994
JP          10 200522          7/1998
(Continued)

OTHER PUBLICATIONS

Julian F. Miller, et al., "Restricted Evaluation Genetic Algorithms with Tabu Search for Optimising Boolean Functions as Multi-Level AND-EXOR Networks," Evolutionary Computing, XP047004261, (19£6), pp. 85-101.*

(Continued)

*Primary Examiner* — Farid Homayounmehr
*Assistant Examiner* — Sanchit Sarker
(74) *Attorney, Agent, or Firm* — Oblon, McClelland, Maier & Neustadt, L.L.P.

(57) ABSTRACT

An input unit inputs a predicate which describes a plurality of selected elements being elements selected by a user. A predicate generation unit extracts two or more than two selected elements that are dependent on the same element in a higher layer, from the plurality of selected elements described in the predicate. Furthermore, the predicate generation unit reduces the number of elements described in the predicate by replacing a description of the two or more than two selected elements extracted with a description of the element in the higher layer.

8 Claims, 5 Drawing Sheets

(58) Field of Classification Search
USPC .......................................................... 380/28
See application file for complete search history.

(56) References Cited

U.S. PATENT DOCUMENTS

| | | | |
|---|---|---|---|
| 9,385,867 B2 | 7/2016 | Takashima et al. | |
| 2006/0072743 A1* | 4/2006 | Naslund .................. | G06F 7/724 380/28 |
| 2007/0189511 A1* | 8/2007 | Venkatesan ............. | G06F 7/725 380/28 |
| 2008/0013722 A1* | 1/2008 | Gentry .................. | H04L 9/0836 380/44 |
| 2012/0045056 A1* | 2/2012 | Takashima ............ | H04L 9/0836 380/255 |
| 2012/0284530 A1* | 11/2012 | Takashima ............ | H04L 9/3073 713/189 |
| 2013/0039489 A1* | 2/2013 | Takashima ............ | H04L 9/0836 380/44 |
| 2013/0089206 A1* | 4/2013 | Englund ............... | H04L 9/0852 380/278 |
| 2013/0287206 A1* | 10/2013 | Hattori .................. | H04L 9/0836 380/30 |
| 2013/0336474 A1* | 12/2013 | Takashima ............ | H04L 9/0836 380/28 |
| 2015/0139421 A1* | 5/2015 | Cordeiro De Oliveira Barros ..................... | H04L 9/14 380/255 |
| 2015/0249536 A1* | 9/2015 | Ichikawa .................. | H04L 9/14 380/28 |

FOREIGN PATENT DOCUMENTS

| | | |
|---|---|---|
| JP | 2005 332049 | 12/2005 |
| JP | 2011 160361 | 8/2011 |
| JP | 2012 163917 | 8/2012 |
| WO | WO 2012/098649 A1 | 7/2012 |
| WO | WO 2012/108100 A1 | 8/2012 |

OTHER PUBLICATIONS

Julian F. Miller, et al., "Restricted Evaluation Genetic Algorithms with Tabu Search for Optimising Boolean Functions as Multi-Level AND-EXOR Networks," Evolutionary Computing, XP047004261, (1996), pp. 85-101.*
Extended European Search Report issued Jul. 21, 2016 in Patent Application No. 13871966.1.
I.B. Turksen, et al., "An Equivalence between Inductive Learning and Pseudo-Boolean Logic Simplification: A Rule Generation and Reduction Scheme," IEEE Transactions on Systems, Man, and Cybernetics, vol. 23, No. 3, XP000412107, May 1993, pp. 907-917.
Okamoto, T., et al., "Fully Secure Functional Encryption with General Relations from the Decisional Linear Assumption", CRYPTO 2010, Lecture Notes in Computer Science, vol. 6223, (2010), pp. 1-65.
Nojima, R., et al., "Tree Based Key Management Using Trapdoor One-Way Functions", Symposium on Cryptography and Information Security (SCIS 2003), IEICE, (Jan. 20-29, 2003), (Total pp. 9).
Takada, K., et al., "A Syntactic Unification Problem under Constrained Substitutions", IEICE Technical Report, (Nov. 1994), vol. 94, No. 354, pp. 95-104.
International Search Report Issued Dec. 3, 2013 in PCT/JP2013/078550 Filed Oct. 22, 2013.

\* cited by examiner

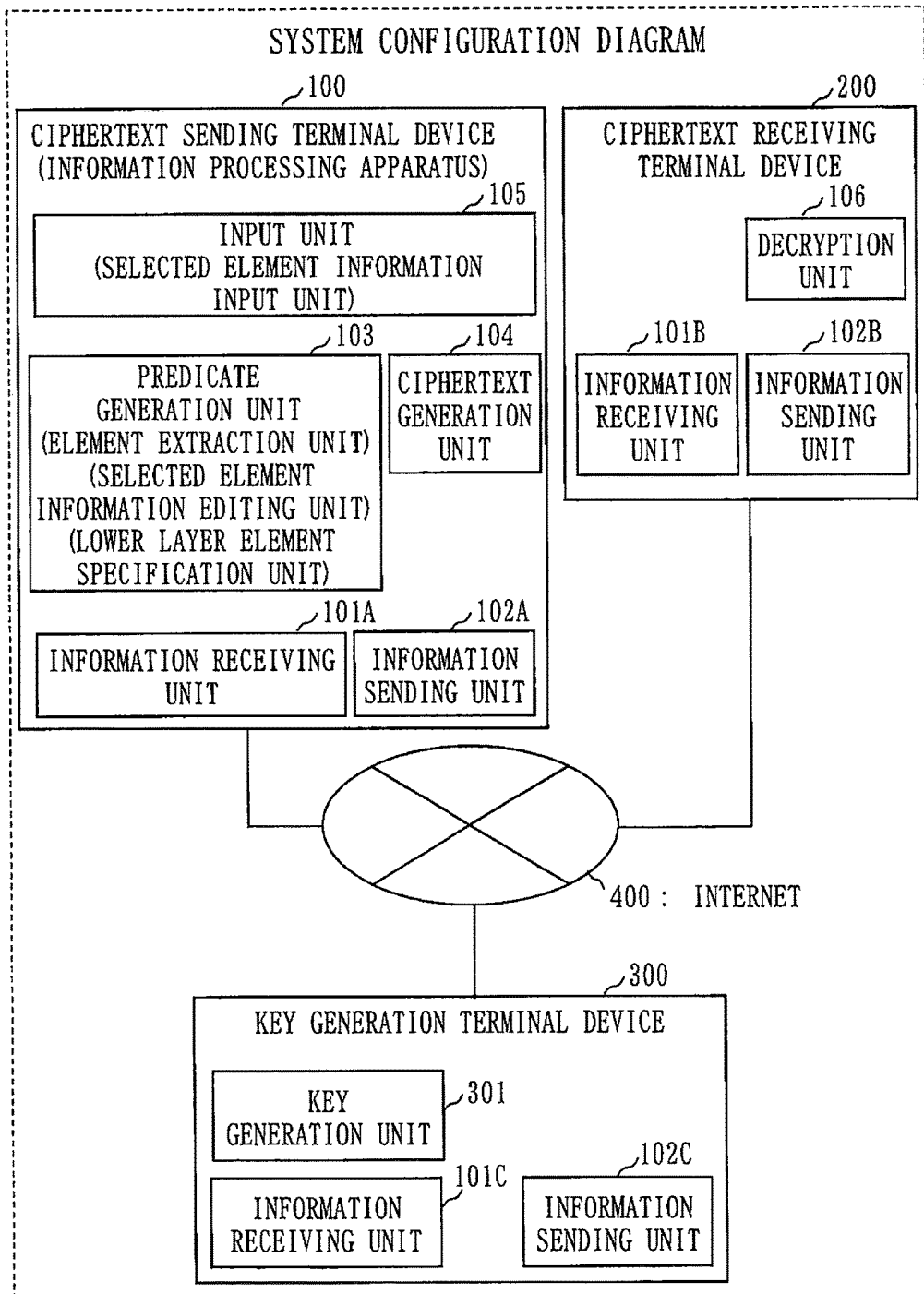

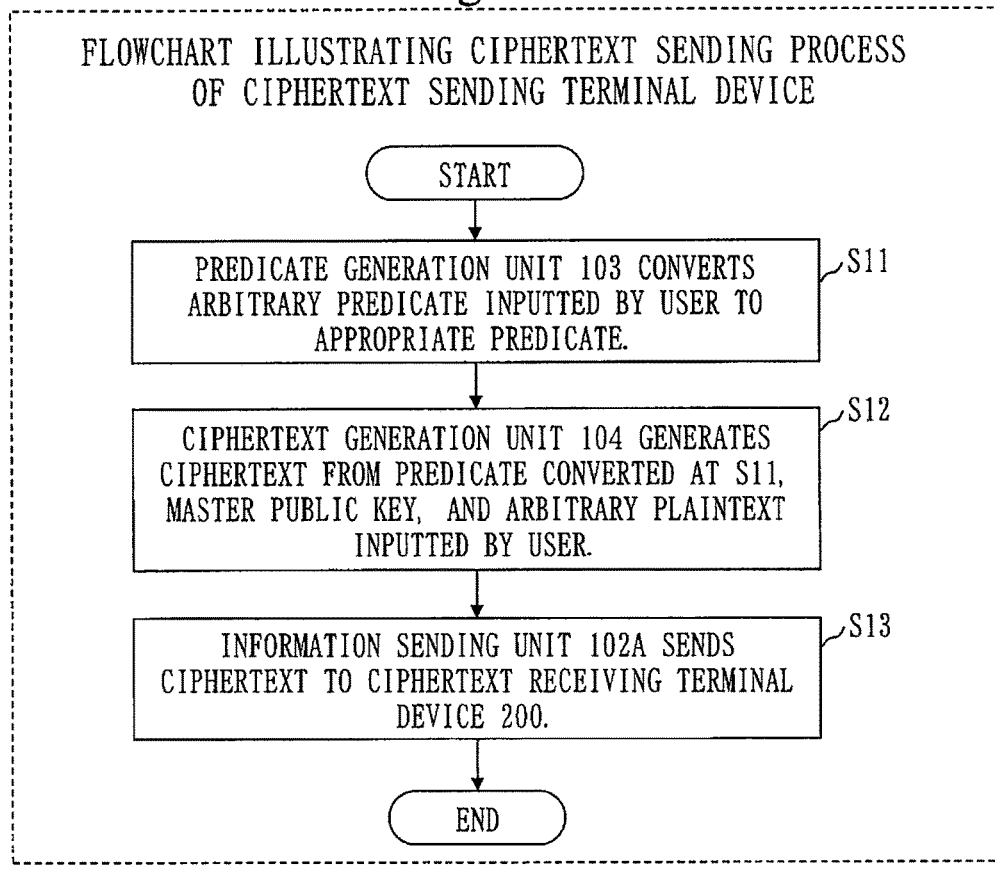

Fig. 4

TABLE OF ORGANIZATION INFORMATION 2

| DIVISION | SECTION | SURNAME |
|---|---|---|
| HUMAN RESOURCES DIVISION | SECTION 3 | SATO |
| HUMAN RESOURCES DIVISION | SECTION 3 | SUZUKI |
| HUMAN RESOURCES DIVISION | SECTION 3 | TAKAHASHI |
| HUMAN RESOURCES DIVISION | SECTION 3 | TANAKA |
| HUMAN RESOURCES DIVISION | SECTION 3 | WATANABE |
| HUMAN RESOURCES DIVISION | SECTION 3 | ITO |
| HUMAN RESOURCES DIVISION | SECTION 3 | YAMAMOTO |
| HUMAN RESOURCES DIVISION | SECTION 3 | NAKAMURA |

Fig. 5

TABLE OF ORGANIZATION INFORMATION 3

| DIVISION | SECTION | SURNAME |
|---|---|---|
| HUMAN RESOURCES DIVISION | SECTION 1 | SATO |
| HUMAN RESOURCES DIVISION | SECTION 1 | SUZUKI |
| HUMAN RESOURCES DIVISION | SECTION 1 | TAKAHASHI |
| HUMAN RESOURCES DIVISION | SECTION 1 | TANAKA |
| HUMAN RESOURCES DIVISION | SECTION 2 | WATANABE |
| HUMAN RESOURCES DIVISION | SECTION 2 | ITO |
| HUMAN RESOURCES DIVISION | SECTION 2 | YAMAMOTO |
| HUMAN RESOURCES DIVISION | SECTION 2 | NAKAMURA |
| HUMAN RESOURCES DIVISION | SECTION 3 | KOBAYASHI |
| HUMAN RESOURCES DIVISION | SECTION 3 | KATO |
| HUMAN RESOURCES DIVISION | SECTION 3 | YOSHIDA |
| HUMAN RESOURCES DIVISION | SECTION 3 | YAMADA |
| HUMAN RESOURCES DIVISION | SECTION 4 | SASAKI |
| HUMAN RESOURCES DIVISION | SECTION 4 | YAMAGUCHI |
| HUMAN RESOURCES DIVISION | SECTION 4 | MATSUMOTO |
| HUMAN RESOURCES DIVISION | SECTION 4 | INOUE |

Fig. 6

| QUANTIFICATION OF LAYERS | |
|---|---|
| Key | Value |
| HUMAN RESOURCES DIVISION | 10 00 00 |
| HUMAN RESOURCES DIVISION SECTION 1 | 10 10 00 |
| SATO | 10 10 01 |
| SUZUKI | 10 10 02 |
| HUMAN RESOURCES DIVISION SECTION 2 | 10 20 00 |
| TAKAHASHI | 10 20 01 |
| TANAKA | 10 20 02 |
| HUMAN RESOURCES DIVISION SECTION 3 | 10 30 00 |
| WATANABE | 10 30 01 |
| ITO | 10 30 02 |
| HUMAN RESOURCES DIVISION SECTION 4 | 10 40 00 |
| YAMAMOTO | 10 40 01 |
| NAKAMURA | 10 40 02 |

Fig. 7

| QUANTIFICATION OF LAYERS 2 | |
|---|---|
| Key | Value |
| HUMAN RESOURCES DIVISION | 10 00 00 |
| HUMAN RESOURCES DIVISION SECTION 1 | 10 10 00 |
| HUMAN RESOURCES DIVISION SECTION 2 | 10 20 00 |
| HUMAN RESOURCES DIVISION SECTION 3 | 10 30 00 |
| SATO | 10 30 01 |
| SUZUKI | 10 30 02 |
| TAKAHASHI | 10 30 03 |
| TANAKA | 10 30 04 |
| WATANABE | 10 30 05 |
| ITO | 10 30 06 |
| YAMAMOTO | 10 30 07 |
| NAKAMURA | 10 30 08 |
| HUMAN RESOURCES DIVISION SECTION 4 | 10 40 00 |

INFORMATION PROCESSING APPARATUS, INFORMATION PROCESSING METHOD, AND PROGRAM

TECHNICAL FIELD

The present invention relates to a technology that converts elements described in information to increase or reduce the number of elements described in the information.

The present invention, for example, relates to a technology that converts an element of a decryption condition described in a predicate to be used in Functional Encryption to increase or reduce the number of elements described in the predicate.

BACKGROUND ART

Various improvements and functional enhancements are continuously being made to a public key cryptography that Diffie and Hellman developed in 1976.

Especially, being motivated by a public key cryptography called ID (Identifier)-based encryption publicized by Boneh and Franklin in 2001 that is based on pairings, notable amount of research on pairing methods have been done in recent years.

In 2010, the functional encryption which is a highly functional public key cryptography that uses the pairings was publicized, as in Non-Patent Literature 1.

Unlike conventional cipher, the functional encryption is an algorithm that is capable of expressing encryption using predicates, and includes a function that is the same as or more than an access control, for example.

As usage of the functional encryption, applying the functional encryption to a general access control may be considered.

If the functional encryption is applied to the access control, expressing a condition by concatenating IDs being unique in a system by a logical operator OR may be considered as the simplest way to use the functional encryption.

An expression such as "Mr. A or Mr. B or Mr. C or . . . " is an example.

This expression, however, needs to use many logical operator OR.

Since encryption/decryption processing time in the functional encryption becomes longer in proportion to the number of logical operators, it is necessary to make an expression with less logical operators as possible.

In addition, when performing encryption using a group, it is necessary to consider how to allow decryption by a user newly added to the group.

For example, a case where data is encrypted with a condition such as "human resources division or general affairs division" will be considered.

It is assumed that members of the human resources division include Mr. A, Mr. B, and Mr. C at encryption.

When Mr. D is added to the human resources division, Mr. D is able to decrypt the encrypted data that was encrypted under the condition of "human resources division or general affairs division" because Mr. D belongs to the human resources division.

With regard to decryption by Mr. D, however, it is not taken into account that Mr. D was not in the human resources division at encryption.

For reliable encryption, the condition is necessary to be set as "Mr. A or Mr. B or Mr. C or . . . ".

Unlike a conventional access control where a system administrator has control, in functional encryption, each user is able to set access control on a file.

As a result, unlike the system administrator who knows the most appropriate access control (providing predicates in the functional encryption), the user needs to be notified of a method to provide the most appropriate predicate as in the example above. An acceptable method, however, is not available.

CITATION LIST

Patent Literature

Patent Literature 1: JPH6-259012 A
Patent Literature 2: JPH10-200522 A

Non-Patent Literature

Non-Patent Literature 1: T. Okamoto, K. Takashima, "Fully Secure Functional Encryption With General Relations from the Decisional Linear Assumption", CRYPTO 2010, Lecture Notes In Computer Science, 2010, Volume 6223/2010.

SUMMARY OF INVENTION

Technical Problem

A method described in Patent Literature 1 is a method to improve security of a file shared among a plurality of users in an environment where the users are grouped in layers according to a type of information that the user can access.

Patent Literature 1 discloses a method according to which an encrypted file managed by a user who belongs to a certain layer can be properly decrypted by a user who belongs to the layer which is higher than the certain layer.

Since an intention of Patent Literature 1 is for the user of the higher layer to correctly decrypt the encrypted file, a conversion method of a predicate, etc. is not disclosed or suggested.

A method described in Patent Literature 2 is a method where only a user that fulfills a decryption condition is possible to refer to contents of data and where stealing of an encryption key of a user by an outsider is prevented.

Since an intention of Patent Literature 2 is also to allow only the user who fulfills the decryption condition to correctly decrypt, a conversion method of a predicate, etc. is not disclosed or suggested.

Historically, in mathematics, methods such as Shannon's expansion theorem, Karnough map, and Quine-McClusky algorithm have been known as conversions of logical operations.

These methods may truncate logical operations, which is a method to truncate logical expressions that include AND, OR, and values that are expressed in binary form (1 or 0 and ON or OFF).

The logical expression including the value itself having a meaning, for example a logical expression including organization information such as human resources division or accounting division, or managerial post information such as section chief and division chief, may not be truncated by the method described above.

Since the predicate used in the functional encryption is such information as the organization information or managerial posts that are not simple two value information as the above, truncation, conversion, etc. is unable to be executed unless another method is used.

The present invention is conceived in light of such situations described above. The present invention mainly aims to convert an element described in information and to increase or reduce, in a most appropriate form, the number of elements described in the information.

Solution to Problem

An information processing apparatus according to the present invention includes:

a selected element information input circuit that inputs selected element information which describes a plurality of selected elements, the selected elements being elements selected from a layer other than a highest layer of a layered structure where two or more than two elements in a lower layer are dependent on an element in a higher layer;

an element extraction circuit that specifies, for each selected element of the plurality of selected elements, an element in the higher layer on which the selected element is dependent as a higher element, counts, for each higher element of a plurality of higher elements specified, the number of selected elements being dependent on the higher element and the number of lower elements being dependent on the higher element and extracts out of the plurality of higher elements, the higher element on which two or more than two selected elements are dependent based on the number of selected elements and the number of lower elements both counted for each higher element; and a selected element information editing circuit that reduces the number of elements described in the selected element information by replacing a description of the two or more than two selected elements being dependent on the higher element extracted by the element extraction circuit with a description of the higher element extracted by the element extraction circuit.

Advantageous Effects of Invention

According to the present invention, since the number of elements described in selected element information may be reduced, it is possible to improve processing speed of a computing process using the selected element information and the number of elements described in the selected element information may be increased. Therefore, it is possible to improve security by executing appropriate access control.

BRIEF DESCRIPTION OF DRAWINGS

FIG. 1 a diagram illustrating an example of a system configuration according to a first embodiment;

FIG. 2 a flowchart illustrating an example of an operation of a ciphertext sending terminal device according to the first embodiment;

FIG. 3 a diagram illustrating an example of organization information according to the first embodiment;

FIG. 4 a diagram illustrating an example of organization information according to the first embodiment;

FIG. 5 a diagram illustrating an example of organization information according to the first embodiment;

FIG. 6 a diagram illustrating an example of quantifying of layers according to a second embodiment;

FIG. 7 a diagram illustrating an example of quantifying of layers according to the second embodiment.

DESCRIPTION OF EMBODIMENTS

Embodiment 1

Figure 8:
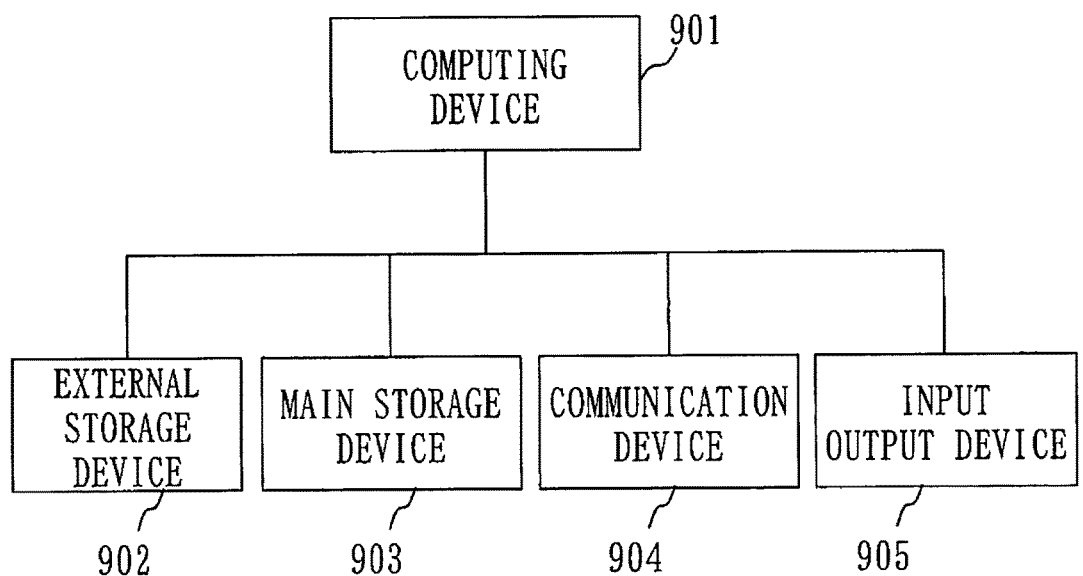
FIG. 8 a diagram illustrating an example of a hardware configuration of the ciphertext sending terminal device according to the first through the third embodiments.

The present embodiment and embodiments hereinafter describe a method to speed up a process and to improve security by appropriately converting a predicate in functional encryption, focusing on a layered structure such as organization information.

For speeding up of the process, it is taken into account how to shorten the predicates. For improving security, it is taken into account whether or not predicates expressed in a shortened way satisfy an original condition for disclosure even if there is addition of or a decrease of users.

The method explained in the present embodiment and embodiments hereinafter are effective not only for the functional encryption, but for all algorithms that encrypt by designating various conditions such as attribute-based encryption.

Hereinafter, a method for a ciphertext sending terminal device to shorten predicates used in encryption of the functional encryption in a network which includes the ciphertext sending terminal device that generates/sends a ciphertext, a ciphertext receiving terminal device that receives/manages the ciphertext, and a key generation terminal device that generates a key to be used in the functional encryption is described.

FIG. 1 is a block diagram illustrating an example of a system configuration according to the present embodiment.

The configuration illustrated in FIG. 1 is only an example, and various configurations may be possible such as a configuration which enables another terminal device to include a predicate generation unit, etc. of the ciphertext sending terminal device, for example.

In FIG. 1, a ciphertext sending terminal device 100 is a terminal device that generates and sends the ciphertext.

A ciphertext receiving terminal device 200 is a terminal device that receives the ciphertext.

A key generation terminal device 300 is a terminal device that generates a master public key/master private key to be used in the functional encryption, and is also possible to generate a user private key to be used in decryption.

The ciphertext sending terminal device 100, the ciphertext receiving terminal device 200, and the key generation terminal device 300 are connected via the Internet 400.

The ciphertext sending terminal device 100 corresponds to an example of an information processing apparatus.

In FIG. 1, information receiving units 101A through C receive information.

For example, the information receiving unit 101B of the ciphertext receiving terminal device 200 receives the ciphertext from the ciphertext sending terminal device 100.

Information sending units 102A through C send information.

For example, the information sending unit 102A sends a ciphertext encrypted by the functional encryption to the ciphertext receiving terminal device 200.

In ciphertext sending terminal device 100, an input unit 105 inputs a predicate to be used in the functional encryption from a user of the ciphertext sending terminal device 100, for example.

The predicate is information which describes an element selected as an element to which the decryption of the ciphertext is allowed (such as an identifier of a person to whom decryption is allowed).

Since many users of the ciphertext sending terminal device 100 have little knowledge on appropriate description methods of predicates, the predicates that the input unit 105 inputs are generally redundant predicates.

The predicates that the input unit 105 inputs correspond to an example of selected element information, and the input unit 105 corresponds to an example of a selected element information input unit.

A predicate generation unit 103 generates an appropriate predicate from the redundant predicates inputted by the input unit 105.

In other words, the predicate generation unit 103 converts an element (such as an identifier) described in the redundant predicate to an element (such as an identifier) of a higher layer, and reduces the number of elements described in the predicate.

The predicate generation unit 103 corresponds to an example of an element extraction unit, the selected element information editing unit, and a lower layer element specification unit.

A ciphertext generation unit 104 inputs the appropriate predicate generated by the predicate generation unit 103, a plaintext, and the master public key, and generates data encrypted by the functional encryption.

In the ciphertext receiving terminal device 200, a decryption unit 106 decrypts the ciphertext received from the ciphertext sending terminal device 100, using the user private key.

In the key generation terminal device 300, a key generation unit 301 generates the master public key and the master private key of the functional encryption.

The key generation unit 301 is also possible to generate the user private key to be used in decryption.

In the present embodiment and in the embodiments hereinafter, are based on premises described below.

The ciphertext sending terminal device 100 obtains the master public key for the functional encryption from the key generation terminal device 300 by an arbitrary method.

The ciphertext receiving terminal device 200 obtains the user private key for the functional encryption from the key generation terminal device 300 by an arbitrary method.

The ciphertext sending terminal device 100 holds a predicate list (the organization information) to be used in the encryption by an arbitrary method.

The predicate list is a data structure to be used in a Data Base.

A terminal not illustrated in the system configuration of FIG. 1 may generate/manage the predicate list.

A flow of a ciphertext sending process will be described using FIG. 1 and FIG. 2.

In the ciphertext sending terminal device 100, the input unit 105 inputs an arbitrary predicate from the user, and the predicate generation unit 103 converts the predicate from the user to an appropriate predicate (Step S11).

Details of the method of the predicate generation unit 103 converting the appropriate predicate will be described later.

Next, the input unit 105 inputs the plaintext to be a target for encryption from the user. The ciphertext generation unit 104 encrypts the plaintext from the user by the functional encryption using the predicate converted at S11 and the master public key, and generates a ciphertext (Step S12).

Finally, the information sending unit 102A sends the ciphertext to the ciphertext receiving terminal device 200 (Step S13).

Next, the details of a conversion process of the predicate by the predicate generation unit 103 as described at Step S11 will be explained.

Hereinafter, an example of reducing the number of identifiers described in a predicate by converting an identifier of a person selected by the user of the ciphertext sending terminal device 100 (the identifier of the person to whom decryption of the ciphertext is allowed) to an identifier of an organization to which the person belongs.

The predicate generation unit 103 performs conversion of the predicate by referring to the organization information (the predicate list) that shows relationship between organizations and people.

If the organization includes units 1 through x according to the organization information, people belonging to each of the units 1 through x are uniquely specified.

FIG. 3 illustrates an example of the organization information that the predicate generation unit 103 refers to.

FIG. 3 illustrates the organization information in a table format as an example, but the organization information may be in any other formats.

In the example shown in FIG. 3, the organization includes layers 1 through 3.

In other words, there are three layers in an order of division-section-surname.

In the example of a layered structure illustrated in FIG. 3, Suzuki and Sato of a "surname" layer depend on Section 1 of a "section" layer. In a similar manner, Takahashi and Tanaka of the "surname" layer depend on Section 2 of the "section" layer, Watanabe and Ito of the "surname" layer depend on Section 3 of the "section" layer, and Yamamoto and Nakamura of the "surname" layer depend on Section 4 of the "section" layer. Furthermore, Section 1, Section 2, Section 3, and Section 4 of the "section" layer depend on a human resources division of a "division" layer.

The ciphertext sending terminal device 100 obtains, as unique information of a system, a table described above (hereinafter the table will be referred to as t) by the time of generating a predicate.

If information such as the surname does not provide uniqueness, information such as an ID may be added.

The predicate generation unit 103 converts the predicate to an appropriate predicate based on the information described.

Assume that the arbitrary predicate from the user is "A or B or C or D".

The predicate generation unit 103 determines, according to t, whether or not each element may be replaced with another expression.

If replacement is possible, the predicate generation unit 103 obtains values in the higher layer of each value of the predicate A through D.

For example, suppose that among the elements illustrated in the "surname" layer of FIG. 3, Sato, Takahashi, Tanaka, and Watanabe are selected by the user, and predicate "Sato or Takahashi or Tanaka or Watanabe" is provided by the user.

The predicate generation unit 103 determines, according to t, that the higher layer on which Sato is dependent is Section 1.

In a similar manner, the predicate generation unit 103 obtains elements in the higher layer on which other elements are dependent.

In the present example, the number of people who belong to Section 1 is one, Section 2 is two, and Section 3 is one.

Assume that the number of people of each section mentioned above is respectively described as $\alpha$.

In other words, the α of Section 1 is 1, the α of Section 2 is 2, and the α of Section 3 is 1.

The number of people who belong to each section is known according to t, and it is understood that the number of people who belong to each section is two.

Assume that the number of people mentioned above is described as β.

If a condition (β/2)+1≤α is satisfied, a replacement with a value in the higher layer is possible.

Section 1 is (2/2)+1=2>1, Section 2 is (2/2)+1=2=2, and Section 3 is (2/2)+1=2>1.

In the present example, some elements may be replaced with Section 2. That is, "Sato or Takahashi or Tanaka or Watanabe" becomes "Sato or Section 2 or Watanabe".

In a similar manner, the predicate generation unit 103 attempts to determine if a replacement with a value in an even higher layer is possible.

It is understood that a layer higher than sections is a division.

In the present example, since the predicate is converted to "Sato or Section 2 or Watanabe", Section 2 is the only one which has the human resources division in its higher layer.

Assume that the number of the sections mentioned above is described as α.

The number of sections that belong to a division is known according to t and it is understood that the number of sections that belong to a division is four.

Assume that the number of the sections mentioned above is described as β.

If the condition (β/2)+1≤α is satisfied, a replacement with a value in the higher layer is possible. Since the present example is (4/2)+1=3>1 and does not satisfy the condition, the predicate generation unit 103 determines that the elements cannot be truncated.

Therefore, in the present example, "Sato or Takahashi or Tanaka or Watanabe" becomes "Sato or Section 2 or Watanabe", and one element is able to be omitted.

Another example of the organization information is illustrated in FIG. 4.

The present example is also an example where layers 1 through 3 exist.

There are also three layers here in the order of division-section-surname. Numbers of each element in the present example are, four in the section and eight in the surname.

In FIG. 4, illustrations of Section 1, Section 2, and Section 4 are omitted.

The predicate generation unit 103 converts the elements of a predicate with a similar method illustrated in FIG. 3.

Assume that the arbitrary predicate from a user is "A or B or C or D or E or F or G".

The predicate generation unit 103 determines, according to t, whether or not each element may be replaced with another expression.

If replacement is possible, the predicate generation unit 103 obtains values in the higher layer of each value of the predicates A through G.

For example, assume that the arbitrary predicate from the user is "Sato or Suzuki or Takahashi or Tanaka or Watanabe or Ito or Yamamoto" according to FIG. 4.

The predicate generation unit 103 determines, according to t, that the higher layer on which Sato is dependent is Section 3.

In a similar manner, the predicate generation unit 103 obtains elements in the higher layer on which other elements are dependent.

In the present example, the number of people who belong to Section 3 is seven.

Assume that the number of the sections mentioned above is described as α.

The number of people who belong to each section is known according to t and it is understood that the number of people who belong to Section 3 is eight in total.

Assume that the number of people mentioned above is described as β.

If the condition (β/2)+1≤α is satisfied, a replacement with a value in the higher layer is possible.

Since the present example is (8/2)+1=5<7, some elements may be replaced with Section 3. That is, "Sato or Suzuki or Takahashi or Tanaka or Watanabe or Ito or Yamamoto" becomes "Section 3 Not Nakamura".

In a similar manner, the predicate generation unit 103 attempts to determine if a replacement with a value in an even higher layer is possible.

It is understood that a layer higher than sections is the human resources division.

In the present example, since the predicate is converted to "Section 3 Not Nakamura", Section 3 is the only one which has the human resources division in its higher layer.

Assume that the number of the sections mentioned above is described as α.

The number of sections that belong to a division is known according to t and it is understood that the number of sections that belong to a division is four.

Assume that the number of the sections mentioned above is described as β.

If the condition of (β/2)+1≤α is satisfied, a replacement with a value in the higher layer is possible. Since the present example is (4/2)+1=3>1 and does not satisfy the condition, the predicate generation unit 103 determines that the elements cannot be truncated.

Therefore, in the present example, "Sato or Suzuki or Takahashi or Tanaka or Watanabe or Ito or Yamamoto" becomes "Section 3 Not Nakamura", and five elements are able to be omitted.

Another example of the organization information is illustrated in FIG. 5.

The present example is also an example where layers 1 through 3 exist.

There are also three layers here in the order of division-section-surname. Numbers of each element in the present example are, four in the section and sixteen in the surname.

The predicate generation unit 103 truncates in the similar method illustrated in FIG. 3.

For example, assume that the arbitrary predicate provided by the user is "Sato or Suzuki or Takahashi or Watanabe or Ito or Yamamoto or Kobayashi or Kato or Sasaki or Yamaguchi or Matsumoto" according to FIG. 5.

The predicate generation unit 103 determines, according to t, that the higher layer on which Sato is dependent is Section 1.

In a similar manner, the predicate generation unit 103 obtains elements in the higher layer on which other elements are dependent.

In the present example, the number of people who belong to Section 1 is three, Section 2 is three, Section 3 is two, and Section 4 is three.

Assume that the number of people of each section mentioned above is respectively described as α.

The number of people who belong to each section is known according to t and it is understood that the number of people who belong to each section is four.

Assume that the number of people mentioned above is described as β.

If the condition $(\beta/2)+1 \leq \alpha$ is satisfied, a replacement with values in the higher layer is possible.

In the present example, some elements may be replaced with Section 1, Section 2, and Section 4. That is, "Sato or Suzuki or Takahashi or Watanabe or Ito or Yamamoto or Kobayashi or Kato or Sasaki or Yamaguchi or Matsumoto" becomes "Section 1 Not Tanaka or Section 2 Not Nakamura or Kobayashi or Kato or the Section 4 Not Inoue".

In a similar manner, a value in an even higher layer is obtained.

It is understood that a layer higher than sections is the human resources division.

In the present example, since the predicate is converted to "Section 1 Not Tanaka or Section 2 Not Nakamura or Kobayashi or Kato or Section 4 Not Inoue", Section 1, Section 2, and Section 4 are the only three that have the human resources division in their higher layer.

Assume that the number of the sections mentioned above is described as $\alpha$.

The number of sections that belong to a division is known according to t and it is understood that the number of sections that belong to a division is four.

Assume that the number of the sections mentioned above is described as $\beta$.

In the present example, since the condition of $(\beta/2)+1 \leq \alpha$ is satisfied, a replacement with the human resources division is possible. "Section 1 Not Tanaka or Section 2 Not Nakamura or Kobayashi or Kato or Section 4 Not Inoue" becomes "The human resources division Not Tanaka Not Nakamura Not Yoshida Not Yamada Not Inoue".

Therefore, in the present example, five elements are able to be omitted.

As described, in the present embodiment, the predicate generation unit 103 obtains the predicate (the selected element information) that describes selected elements which are the plurality of elements the user selected (the selected element information).

Then, the predicate generation unit 103 extracts two or more than two selected elements that are dependent on the same element in the higher layer from the plurality of selected elements described in the predicate designated by the user.

More specifically, the predicate generation unit 103 extracts three or more than three selected elements that are dependent on the same element in the higher layer. The three or more than three selected elements are possible to reduce the number of elements to be described in the predicate the user designated. Furthermore, the three or more than three selected elements do not cause any change between a condition defined by the three or more than three selected elements before a replacement and a condition defined by a combination of elements after the replacement even when the description of the three or more than three selected elements are to be replaced with a description of the element in the higher layer on which the three or more than three selected elements are dependent and a description of an element (description of "Not element") which is dependent on the element in the higher layer on which the three or more than three selected elements are dependent and is other than the three or more than three selected elements.

Further, the predicate generation unit 103 reduces the number of elements to be described in the predicate designated by the user by replacing the description of two or more than two selected elements extracted with the description of an element in the higher layer on which the selected elements are dependent, and by replacing with the description of an element (description of "Not element") other than the plurality of selected elements, the element being dependent on an element in the higher layer on which the two or more than two selected elements are dependent.

According to the present embodiment, high speed calculation and improvements in security may be realized by appropriately converting a predicate used in the functional encryption.

Embodiment 2

The present embodiment also describes a method for a ciphertext sending terminal device to shorten predicates used in encryption of the functional encryption in a network which includes the ciphertext sending terminal device that generates/sends a ciphertext, a ciphertext receiving terminal device that receives/manages the ciphertext, and a key generation terminal device that generates a key to be used in the functional encryption.

An example of a system configuration according to the present embodiment is the same as that illustrated in FIG. 1.

Furthermore, a flow of a ciphertext sending process is the same as that illustrated in FIG. 2.

In the present embodiment, a data structure of a list of predicates (organization information) that the predicate generation unit 103 refers to is different.

The list of predicates according to the present embodiment has a data structure such as a hash table.

A terminal not illustrated in the system configuration of FIG. 1 may generate/manage the predicate list.

Various data structures may be used for the list of predicates.

Layers in the list of predicates according to the present embodiment are expressed by numerical values to output an appropriate predicate.

When layers 1 to x exist, the top layer is represented as $A_1$ and the lowest layer is represented as $A_x$.

Numerical values are given to each layer.

The numerical values are distinguishable among layers.

Examples are described below.

FIG. 6 illustrates an example of quantifying of layers.

FIG. 6 is an example where the layers 1 to 3 exist.

In the present example, there are three layers, section-division-surname, and the number of elements in each layer are four in section and two in surname.

When the human resources division is expressed as "100000", the numerical value is expressed as "10" "00" "00" by dividing it into three, for easier understanding because there are three layers.

Each part of the value expresses a meaning of each layer.

Obviously, the depth of layers is in proportion with the magnitude of values.

In the present example, each part is in two digits because each element may be expressed between numbers 1 through 9.

Expressions are easier if the number of the digits matches the largest number in the entire elements, but the number of digits does not necessarily match the largest number.

When each element exists from 1 to 99, each part may be in three digits.

The maximum number of each element is also in proportion with the magnitude of values.

FIG. 6 is only an example.

The ciphertext sending terminal device 100 obtains, as unique information of a system, a table of numerical values that expresses the layers (hereinafter the table will be referred to as t) by the time of generating a predicate.

The predicate generation unit 103 converts the predicate to an appropriate predicate based on this information.

Apart from Embodiment 1, the hash table is used for search. The present invention, however, basically does not depend on the data structure as long as the data structure that is searchable is used.

A system construction that makes use of the uniqueness of each data structure is possible.

As a feature of the hash table, the hash table is specialized in searching with high speed.

Using the hash table requires construction of layers separately, layers such as an example mentioned above are expressed in values.

Assume that the arbitrary predicate from the user is "A or B or C or D".

The predicate generation unit 103 determines, according to t, whether or not each element may be replaced with another expression.

If replacement is possible, the predicate generation unit 103 obtains values in the higher layer of each value of the predicate A through D.

For example, assume that the arbitrary predicate provided by the user is "Sato or Takahashi or Tanaka or Watanabe" according to FIG. 6.

According to t, Sato is "101001", and it is understood that its higher layer is "101000", with clarification of the largest value in the elements beforehand.

By creating separately t' that enables a reverse lookup of t, it is understood that Section 1 is obtained as a result of a search with "101000".

The predicate generation unit 103 also obtains the elements in the higher layer on which other elements are dependent, in a similar manner.

In the present example, the number of people who belong to Section 1 is one, Section 2 is two, and Section 3 is one.

Assume that the number of people of each section mentioned above is respectively described as $\alpha$.

The number of people who belong to each section is known according to t and it is understood that the number of people that belong to each section is two.

Assume that the number of people mentioned above is described as $\beta$.

If the condition $(\beta/2)+1 \le \alpha$ is satisfied, a replacement with a value in the higher layer is possible.

In the present example, some elements may be replaced with Section 2. That is, "Sato or Takahashi or Tanaka or Watanabe" becomes "Sato or Section 2 or Watanabe".

The predicate generation unit 103 attempts to determine if conversion with values in an even higher layer is possible in a similar manner.

It is understood that a layer higher is "100000" (the human resources division).

In the present example, since the predicate is converted to "Sato or Section 2 or Watanabe", Section 2 is the only one which has the human resources division in its higher layer.

Assume that the number of the sections mentioned above is described as $\alpha$.

The number of sections that belong to a division is known according to t and it is understood that the number of sections that belong to a division is four.

Assume that the number of the sections mentioned above is described as $\beta$.

Since the condition of $(\beta/2)+1 \le \alpha$ is not satisfied, the predicate generation unit 103 determines that truncation is impossible.

Therefore, in the present example, "Sato or Takahashi or Tanaka or Watanabe" becomes "Sato or Section 2 or Watanabe", and one element is able to be omitted.

Another example of quantifying layers is illustrated in FIG. 7.

The present example is also an example where layers 1 through 3 exist.

There are also three layers here in an order of division-section-surname. Numbers of each element in the present example is, four in section and eight in surname.

Quantifying of layers is performed in a similar manner as FIG. 6.

Assume that the arbitrary predicate from the user is "A or B or C or D or E or F or G".

The predicate generation unit 103 determines, according to t, whether or not each element may be replaced with another expression.

If replacement is possible, the predicate generation unit 103 obtains values in the higher layer of each value of the predicate A through G.

For example, assume that the arbitrary predicate from the user is "Sato or Suzuki or Takahashi or Tanaka or Watanabe or Ito or Yamamoto" according to FIG. 7.

The predicate generation unit 103 determines, according to t, that Sato is "103001" and its higher layer is "103000" (Section 3).

The predicate generation unit 103 also obtains the elements in the higher layer on which other elements are dependent in a similar manner.

In the present example, the number of people who belong to Section 3 is seven.

Assume that the number of people mentioned above is described as $\alpha$.

The number of people who belong to each section is known according to t and it is understood that the number of people who belong to Section 3 is eight in total.

Assume that the number of people mentioned above is described as $\beta$.

If the condition $(\beta/2)+1 \le \alpha$ is satisfied, a replacement with a value in a higher layer is possible.

In the present example, some elements may be replaced with Section 3. That is, "Sato or Suzuki or Takahashi or Tanaka or Watanabe or Ito or Yamamoto" becomes "Section 3 Not Nakamura".

The predicate generation unit 103 attempts to determine if conversion with values in an even higher layer is possible in a similar manner.

It is understood that a layer higher is "100000" (the human resources division).

In the present example, since the predicate is converted to "Section 3 Not Nakamura", Section 3 is the only one where the human resources division is in its higher layer.

Assume that the number of sections mentioned above is described as $\alpha$.

The number of sections that belong to a division is known according to t and it is understood that the number of sections that belong to a division is four.

Assume that the number of sections mentioned above is described as $\beta$.

Since the condition of $(\beta/2)+1 \le \alpha$ is not satisfied, the predicate generation unit 103 determines that truncation is impossible.

Therefore, in the present example, "Sato or Suzuki or Takahashi or Tanaka or Watanabe or Ito or Yamamoto" becomes "Section 3 Not Nakamura", and five elements are able to be omitted.

Embodiment 3

In the present embodiment, a method for a ciphertext sending terminal device to securely provide predicates used in encryption of functional encryption in a network that includes the ciphertext sending terminal device that generates/sends a ciphertext, a ciphertext receiving terminal device that receives/manages the ciphertext, and a key generation terminal device that generates a key to be used in the functional encryption is described.

An example of a system configuration according to the present embodiment is the same as that illustrated in FIG. 1.

A prerequisite is also the same as that of Embodiment 1.

Apart from Embodiments 1 and 2, predicates are not truncated according to groups and a predicate is instead given based on every person, and access rights are steadily set in the present embodiment.

Embodiments 1 and 2 are suitable for an encryption of a communication channel such as an encrypted electronic mail, whereas the present embodiment has an advantage which steadily handles withdrawal or addition of members during a long term management of a ciphertext.

In the present embodiment, an explanation will be carried out by using the organization information illustrated in FIG. 3.

In the present embodiment, the input unit 105 inputs a predicate that includes an element in a layer other than the lowest layer.

Then, a predicate generation unit 103 according to the present embodiment converts, of elements described in the predicate, an element in a layer other than the lowest layer to two or more than two elements in the lower layer.

In the present embodiment, assume that an arbitrary predicate from a user is "A Not B".

The predicate generation unit 103 considers, according to t, whether or not each element may be replaced with another expression.

If replacement is possible, the predicate generation unit 103 obtains values in a layer lower than the layer that A and 13 belong to.

For example, assume the arbitrary predicate provided by the user is "Section 3 Not Nakamura".

The predicate generation unit 103 determines, according to t, that the layer lower than Section 3 includes Sato, Suzuki, Takahashi, Tanaka, Watanabe, Ito, Yamamoto, and Nakamura.

Since there is no layer lower than Nakamura at present, Nakamura is ignored.

The present example has "Not Nakamura", and because Nakamura belongs to Section 3, the predicate generation unit 103 eliminates Nakamura from its condition.

Next, the predicate generation unit 103 concatenates the remaining elements with OR. "Section 3 Not Nakamura" becomes "Sato or Suzuki or Takahashi or Tanaka or Watanabe or Ito or Yamamoto".

The predicate generation unit 103 attempts to determine if conversion with values in an even lower layer is possible in a similar manner.

In the present example, there is no information on a lower layer. The predicate becomes fixed as "Sato or Suzuki or Takahashi or Tanaka or Watanabe or Ito or Yamamoto", and a ciphertext generation unit 104 encrypts using this predicate.

If Kobayashi is added to Section 3, since Kobayashi did not belong to Section 3 at the time of generating the ciphertext, Kobayashi may be made unable to decipher the ciphertext by such conversion.

In the organization information of FIG. 5, the elements in the higher layer is converted to the elements in the lower layer in the similar method as illustrated in FIG. 3.

For example, assume that the arbitrary predicate provided by the user is "the human resources division Not Tanaka Not Nakamura Not Yoshida Not Yamada Not Inoue".

It is understood that layers lower than the human resources division are Section 1, Section 2, Section 3, and Section 4.

In the present example, "human resources division Not Tanaka Not Nakamura Not Yoshida Not Yamada Not Inoue" becomes "Section 1 or Section 2 or Section 3 or Section 4 Not Tanaka Not Nakamura Not Yoshida Not Yamada Not Inoue".

In a similar manner, those in the layer lower than Section 1 through Section 4 are Sato, Suzuki, Takahashi, Tanaka, Watanabe, Ito, Yamamoto, Nakamura, Kobayashi, Kato, Yoshida, Yamada, Sasaki, Yamaguchi, Matsumoto, and Inoue.

In the present example, there is no information of even lower layers, and to illustrate those corresponding to a condition with Not, the predicate becomes "Sato or Suzuki or Takahashi or Watanabe or Ito or Yamamoto or Kobayashi or Kato or Sasaki or Yamaguchi or Matsumoto".

Elements in the higher layer may be converted to the elements in the lower layer by a similar method as the above in cases exemplified in FIG. 6 and FIG. 7 where layers are quantified (the hash table).

As described, in the present embodiment, the input unit 105 inputs a predicate (selected element information) which describes elements in a layer other than the lowest layer.

And, the predicate generation unit 103 specifies, for the element in a layer other than the lowest layer, two or more than two elements in a lower layer which are dependent on the element in the layer other than the lowest layer.

Furthermore, the predicate generation unit 103 replaces a description of the element in the layer other than the lowest layer with a description of the two or more than two elements specified in the lower layer.

In the embodiments above, a description has been given of a terminal device that includes a function that is possible to convert an access condition of an arbitrary data that a user inputs to a predicated appropriate for a system. The terminal device includes the following functions.

(1) An ability to process at high speed if predicates are shortened in functional encryption or in attribute-based encryption.

If a user sets a redundant condition, the condition is expressed in an appropriate short form.

(2) To support providing a decryption permission authority appropriately because in functional encryption or in attribute-based encryption, the decryption permission authority is possibly provided without a user's intention during encryption targeted to a group.

(3) A list of predicates (conversion support information) that is referred to by users.

(4) The list is applicable to any data structure.

In the embodiments above, another description has been given of a terminal device in which conversions are focused on a layered structure, and conversions are made possible with the list of predicates whose data structure is a data structure suitable for using a layered structure or a data structure of a layered structure constructed by a system. The terminal device includes the following functions.

(1) Enable character string conversion by expressing a layered structure without modification.

(2) Enable character string conversion by expressing a layered structure with a modification.

(3) Convert information such as organization information or hierarchy to information of a higher or a lower layer.

(4) Use a data structure specialized in high speed operation.

(5) Use a data structure that enables easy addition or deletion of data.

Embodiments of the present invention has been described. Of the embodiments, two or more of the embodiments may be combined and executed.

Or, of the embodiments, a part of an embodiment may be executed.

Or, of the embodiments, parts of two or more of the embodiments may be combined and executed.

The present invention is not limited to the embodiments, and various changes may be possible as necessary.

Lastly, an example of a hardware configuration of the ciphertext sending terminal device 100 described in Embodiments 1 through 3 will be described referring to FIG. 8.

The ciphertext sending terminal device 100 is a computer and is possible to implement each element of the ciphertext sending terminal device 100 by a program.

In the hardware configuration of the ciphertext sending terminal device 100, a computing device 901, an external storage device 902, a main storage device 903, a communication device 904, and an input output device 905 are connected to a bus.

The computing device 901 is a CPU (Central Processing Unit) that executes programs.

The external storage device 902 is, for example, a ROM (Read Only Memory), a flash memory, or a hard disc device.

The main storage device 903 is a RAM (Random Access Memory).

The communication device 904 corresponds to physical layer of an information receiving unit 101A and an information sending unit 102A.

The input output device 905 is, for example, a mouse, a keyboard, a display device, etc.

The programs are usually stored in the external storage device 902. The programs as loaded in the main storage device 903 are read sequentially and executed by the computing device 901.

Programs are those that implement functions each described as " . . . unit" illustrated in FIG. 1.

Furthermore, an operating system (OS) is also stored in the external storage device 902. At least a part of the OS is loaded into the main storage device 903, and the computing device 901 executes programs each of which implements the function of " . . . unit" illustrated in FIG. 1 while executing the OS. The information, data, signal values, and variable values representing the results of processes that are explained as "decision of . . . ", "determination of . . . ", "extraction of . . . ", "replacement of . . . ", "referring of . . . ", "obtaining of . . . ", "selection of . . . ", "generation of . . . ", "inputting of . . . ", "reception of . . . ", etc. in the description of Embodiments 1 through 3, are stored in the main storage device 903 as a file.

A master public key, other keys, random values, and parameters may be stored in the main storage device 903 as a file.

The configuration of FIG. 8 illustrates only an example of the hardware configuration of the ciphertext sending terminal device 100. The hardware configuration of the ciphertext sending terminal device 100 may have another configuration, not limited to the configuration illustrated in FIG. 8.

The information processing method of the present invention may be implemented with the procedures described in Embodiments 1 through 3.

REFERENCE SIGNS LIST

100: ciphertext sending terminal device, 101: information receiving unit, 102: information sending unit; 103: predicate generation unit, 104: ciphertext generation unit, 105: input unit, 106: decryption unit, 200: ciphertext receiving terminal device, 300: key generation terminal device, 301: key generation unit, 400: Internet

The invention claimed is:

1. An information processing apparatus comprising:
a selected element information input circuit that inputs selected element information which describes a plurality of selected elements, the selected elements being elements selected from a layer other than a highest layer of a layered structure where two or more than two elements in a lower layer are dependent on an element in a higher layer;
an element extraction circuit that specifies, for each selected element of the plurality of selected elements, an element in the higher layer on which the selected element is dependent as a higher element, counts, for each higher element of a plurality of higher elements specified, the number of selected elements being dependent on the higher element and the number of lower elements being dependent on the higher element and extracts out of the plurality of higher elements, the higher element on which two or more than two selected elements are dependent based on the number of selected elements and the number of lower elements both counted for each higher element; and
a selected element information editing circuit that reduces the number of elements described in the selected element information by replacing a description of the two or more than two selected elements being dependent on the higher element extracted by the element extraction circuit with a description of the higher element extracted by the element extraction circuit, and improves an encryption processing speed using the selected element information,
wherein the element extraction circuit extracts, when the number of selected elements is defined as $\alpha$ and the number of lower elements is defined as $\beta$, the higher element on which the two or more than two selected elements are dependent and satisfies a condition of $(\beta/2)+1 \leq \alpha$.

2. The information processing apparatus of claim 1, wherein
the selected element information editing circuit replaces the description of the two or more than two selected elements being dependent on the higher element extracted by the element extraction circuit with the description of the higher element extracted by the element extraction circuit and the description for excluding the lower element other than the two or more than two selected elements from the lower elements being dependent on the higher element.

3. The information processing apparatus of claim 1, wherein
the selected element information input circuit inputs the selected element information that defines, by the description of a plurality of selected elements, a condition for allowing access to data to which an access limitation is made.

4. The information processing apparatus of claim 1, wherein
the selected element information input circuit inputs the selected element information that defines, by the description of the plurality of selected elements, a condition for allowing decryption of encrypted data based on at least either one of functional encryption or attribute-based encryption.

5. The information processing apparatus of claim 1, wherein
the selected element information input circuit may input selected element information which describes an element in a layer other than a lowest layer of the layered structure,
the information processing apparatus further comprising:
a lower layer element specification circuit that, when the selected element information input circuit inputs the selected element information, specifies, for the element in a layer other than the lowest layer described in the selected element information, two or more than two elements in a lower layer which are dependent on the element in the layer other than the lowest layer, wherein
the selected element information editing circuit replaces a description of the element in the layer other than the lowest layer in the selected element information with a description of the two or more than two elements in the lower layer specified by the lower layer element specification circuit.

6. The information processing apparatus of claim 4, wherein
the lower layer element specification circuit that, when the selected element information input circuit inputs the selected element information, specifies, for the element in a layer other than the lowest layer described in the selected element information, two or more than two elements in the lowest layer which are dependent on the element in the layer other than the lowest layer, and
the selected element information editing circuit replaces the description of the element in the layer other than the lowest layer in the selected element information with a description of the two or more than two elements in the lowest layer specified by the lower layer element specification circuit.

7. An information processing method by a computer comprising:
inputting selected element information which describes a plurality of selected elements, the selected elements being elements selected from a layer other than a highest layer of a layered structure where two or more than two elements in a lower layer are dependent on an element in a higher layer;
specifying for each selected element of the plurality of selected elements, an element in the higher layer on which the selected element is dependent as a higher element;
counting for each higher element of a plurality of higher elements specified, the number of selected elements being dependent on the higher element and the number of lower elements being dependent on the higher element;
extracting out of the plurality of higher elements, the higher element on which two or more than two selected elements are dependent based on the number of selected elements and the number of lower elements both counted for each higher element; and
reducing the number of elements described in the selected element information by replacing a description of the two or more than two selected elements being dependent on the higher element extracted with a description of the higher element extracted, and improving an encryption processing speed using the selected element information,
wherein the extracting extracts, when the number of selected elements is defined as $\alpha$ and the number of lower elements is defined as $\beta$, the higher element on which the two or more than two selected elements are dependent and satisfies a condition of $(\beta/2)+1 \leq \alpha$.

8. A non-transitory computer readable medium including a computer executable program that makes a computer execute:
a selected element information input process that inputs selected element information which describes a plurality of selected elements, the selected elements being elements selected from a layer other than a highest layer of a layered structure where two or more than two elements in a lower layer are dependent on an element in a higher layer;
an element extraction process that specifies, for each selected element of the plurality of selected elements, an element in the higher layer on which the selected element is dependent as a higher element, counts, for each higher element of a plurality of higher elements specified, the number of selected elements being dependent on the higher element and the number of lower elements being dependent on the higher element and extracts out of the plurality of higher elements, the higher element on which two or more than two selected elements are dependent based on the number of selected elements and the number of lower elements both counted for each higher element; and
a selected element information editing process that reduces the number of elements described in the selected element information by replacing a description of the two or more than two selected elements being dependent on the higher element extracted by the element extraction process with a description of the higher element extracted by the element extraction process, and improves an encryption processing speed using the selected element information,
wherein the extracting extracts, when the number of selected elements is defined as $\alpha$ and the number of lower elements is defined as $\beta$, the higher element on which the two or more than two selected elements are dependent and satisfies a condition of $(\beta/2)+1 \leq \alpha$.

* * * * *